United States Patent [19]

Bobier et al.

[11] Patent Number: 4,742,291

[45] Date of Patent: May 3, 1988

[54] INTERFACE CONTROL FOR STORAGE BATTERY BASED ALTERNATE ENERGY SYSTEMS

[75] Inventors: Joseph A. Bobier, St. Mary's; Gerald E. Brown, Parkersburg, both of W. Va.

[73] Assignee: Bobier Electronics, Inc., Parkersburg, W. Va.

[21] Appl. No.: 800,556

[22] Filed: Nov. 21, 1985

[51] Int. Cl.$^4$ .............................. H02J 7/00; H02J 9/04
[52] U.S. Cl. ......................................... 320/39; 290/50; 307/66; 320/32; 320/61; 323/906
[58] Field of Search .................... 320/2, 61, 31, 32, 39, 320/40; 307/64, 66; 323/906; 290/44, 55, 50

[56] References Cited

U.S. PATENT DOCUMENTS

| | | | |
|---|---|---|---|
| 3,350,618 | 10/1967 | Barney et al. | 320/5 |
| 3,489,915 | 1/1970 | Engelhardt | 307/66 |
| 3,566,143 | 2/1971 | Paine | 323/906 X |
| 3,904,948 | 9/1925 | Earle | 322/100 X |
| 4,100,427 | 7/1978 | Durand et al. | 307/87 |
| 4,180,745 | 12/1979 | Bartlett et al. | 307/45 |
| 4,287,465 | 9/1981 | Godard | 320/56 |
| 4,293,808 | 10/1981 | Varadi et al. | 320/2 |
| 4,315,163 | 2/1982 | Bienville | 307/66 |
| 4,327,318 | 3/1982 | Kwon et al. | 320/39 |
| 4,362,950 | 12/1982 | Turner | 307/45 |
| 4,375,662 | 3/1983 | Baker | 363/95 |
| 4,427,897 | 1/1984 | Migliori | 290/44 |
| 4,453,119 | 6/1984 | Staler et al. | 320/39 |
| 4,467,265 | 8/1984 | Hierholzer, Jr. | 320/40 X |
| 4,604,567 | 8/1986 | Chetty | 323/906 X |

FOREIGN PATENT DOCUMENTS

2158621 11/1985 United Kingdom ............... 323/906

OTHER PUBLICATIONS

ACR-3 System Controler, A Brochure Having a 1983 Copyright by Solarex Corporation.

Primary Examiner—R. J. Hickey
Attorney, Agent, or Firm—Mueller and Smith

[57] ABSTRACT

An alternate energy interface control for implementation with utility derived power sources and alternate power sources such as are provided by solar panels, windmills, and the like employed with systems utilizing storage batteries. The system monitors the current level of photovoltaic solar panels within intervals during such panels are connected with the battery storage source and further monitors the voltage levels developed by such panels during normal open circuit conditions thereof. A logic control is provided which monitors alternate source currents and voltage as well as storage battery voltage levels to prioritize the use of available alternate energy sources. Battery charging during periods of alternate power source availability is with a pulsed technique to enhance battery lifespans.

24 Claims, 6 Drawing Sheets

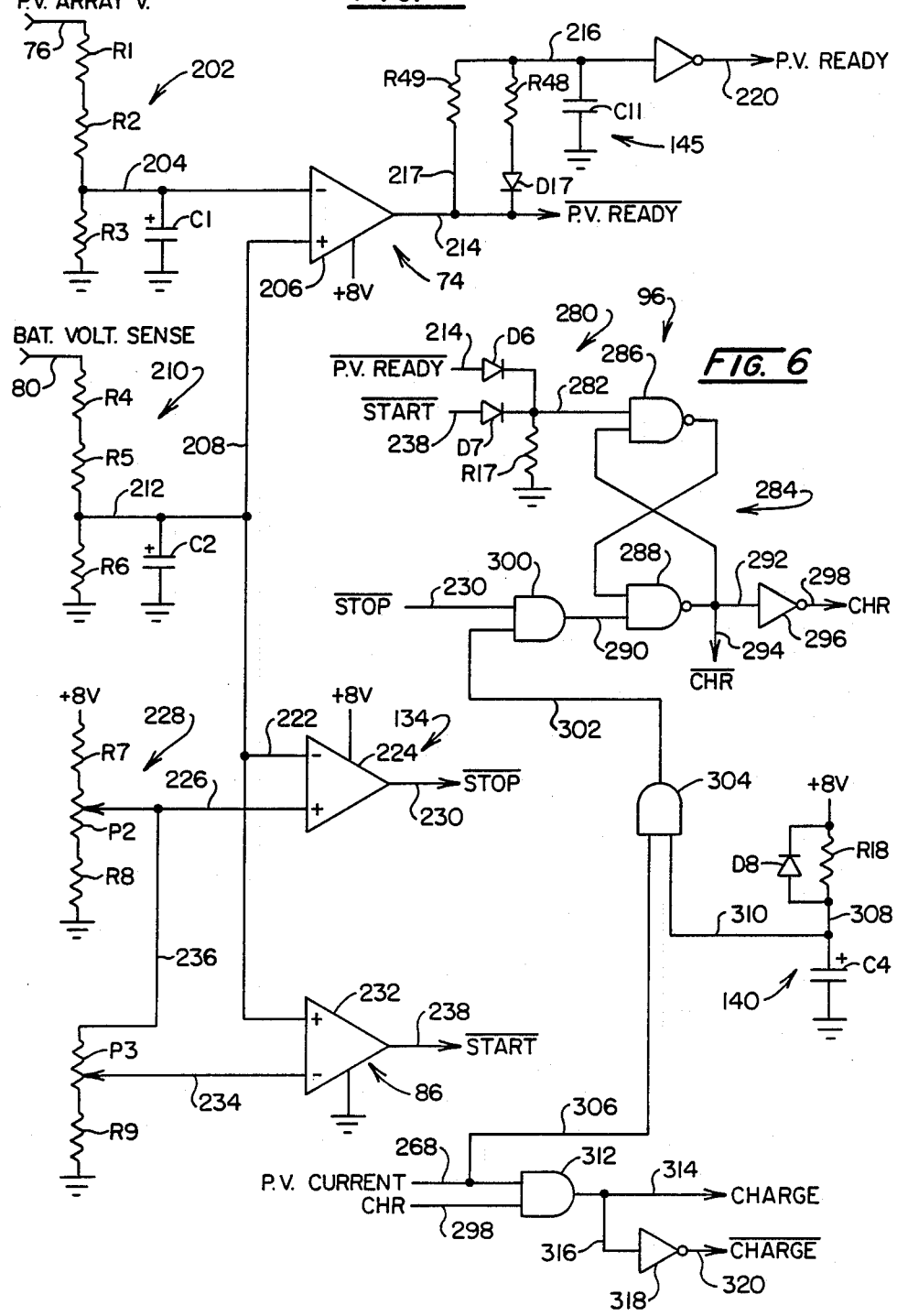

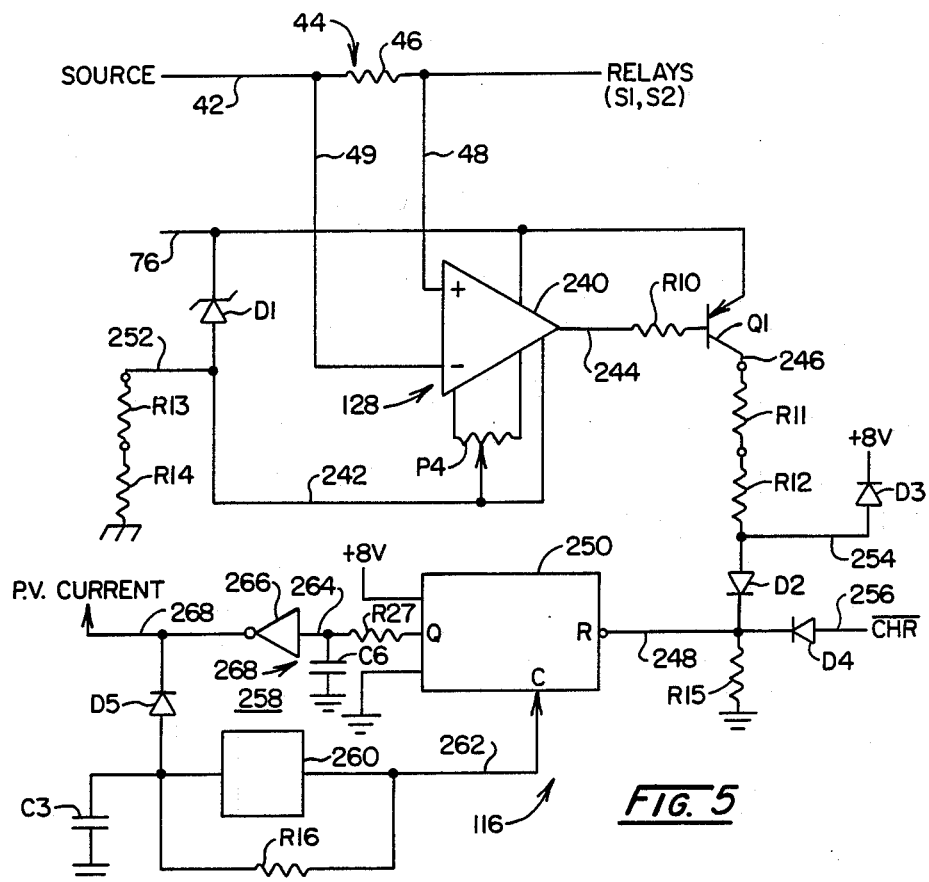
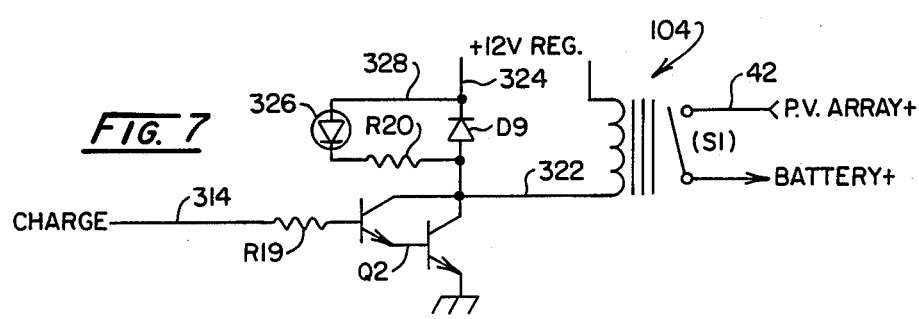
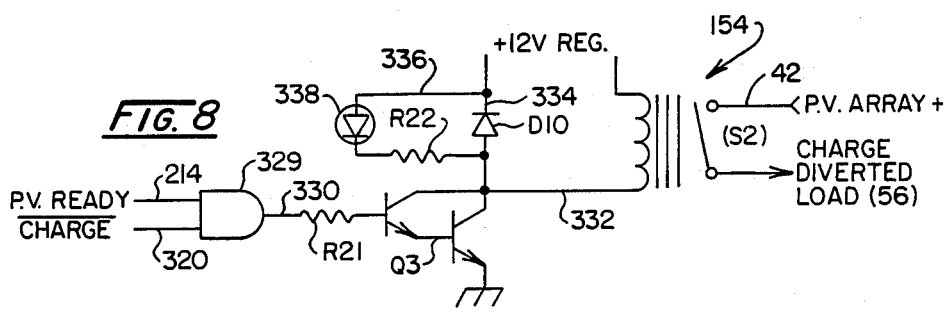

INTERFACE CONTROL FOR STORAGE BATTERY BASED ALTERNATE ENERGY SYSTEMS

BACKGROUND OF THE INVENTION

As the cost of energy conversion is increased on a worldwide basis, extensive developments have been undertaken to make alternative energy sources available not only to industry but also to the home. Wind and solar energy have been harnessed in endeavors ranging from highly complex and elaborate prototype installations to the approaches of the home handyman. From these endeavors, there have developed a selection of viable wind and solar energy power generating devices which have become available to the consumer in the domestic marketplace. Each, necessarily, is an intermittently performing device, wind usually not being a steady state phenomenon and the energy of the sun being modified by factors of earth time and weather. As a consequence of this production intermittency, these systems generally serve an alternate power generating role supplementing that power conventionally available from utility companies.

To accommodate for the variable availability of energy for conversion, the alternate power sources are installed in conjunction with a storage media, typically in the form of batteries. Thus, energy may be harnessed and stored in the batteries during intervals of availability, then such stored energy is used at more convenient times. The type of battery conventionally employed with the alternate energy system is one of a "deep cycling" variety which can be repeatedly completely discharged and recharged essentially without damage. The batteries are typically employed in applications where steady current is to be used over a relatively lengthy period of time and they are structured having a lead-liquid electrolyte architecture. While these battery structures may be deep cycled over a relatively large number of cycles, their life spans are limited thereby such that it is desirable to retain thereat a relatively fully charged status. For this purpose, charging techniques are employed in a two-step arrangement wherein full power is applied to the batteries until they are charged, whereupon, a resistance is switched into the charging circuit to significantly reduce the amount of current into the batteries and provide a low level or "trickle" charging current. Such charging charge is often referred to as a "maintenance charge". Where such steady charging continues, even though the battery is at its ultimate charge capacity, the electrolyte therein may tend to boil, and thus to generate hydrogen gas which is explosive in free air. Further, electrolyte levels within the battery may diminish to expose the plates thereof to atmosphere and cause erosion. Of course, by imposing a resistance in the charging system, energy is lost.

Solar panels, for example of the photovoltaic variety, function to generate voltages and d.c. currents in response to sun activation and, thus, their outputs may be employed for storage battery charging. However, when coupled within a storage battery based system, complexities arise in achieving an optimized performance of such combinations. For example, when in operation, the panels are electrically coupled in charging relationship with the batteries. As such, the photovoltaic panels will assume the voltage level of the batteries and, consequently, the operational status of the solar panel is not determined readily by constant voltage monitoring techniques. To determine the operational status of the panels, the conventional practice has been to interrupt the charge cycle and to test the panels in isolation in accordance with some prearranged timed schedule. Such timing, unless meticulously maintained, often will be inadequate with the result that back current activity may ensue. To correct for such back discharge, typically, line current blocking diodes are employed which are power consuming heat dissipators.

Those designing photovoltaic solar panel based alternative energy sources also encounter an operational phenomenon wherein the panels will exhibit an operational voltage level upon being initially activated by the sun. However, while exhibiting acceptable voltage levels, they will not generate current for a period of time following this initial witnessing of adequate voltage levels. Thus, time based factors of safety generally are required in establishing operational periods in which the panels are coupled within the system. These time based systems are not constant in nature. In this regard, the amount of sun available during any period of the day will vary with the seasons, as well as with weather during those changing seasons. Thus, it is necessary to continuously adjust the time control aspects of any solar based alternative energy system. This timing aspect represents a particularly critical input when considering the periodicity of winds which may be used in conjunction with windmill powered alternate energy sources. Here the timing must be very carefully adjusted with respect to known but variable wind histories at the point of installation. Windmills also pose a safety problem in terms of their maintenance where any possibility for back currents may occur. For example, the devices very often will "motor" or be driven by such currents, a condition which may pose hazards to maintenance personnel.

The straightforward timing approaches to controling the employment of alternate energy sources within a hybrid power supply system also is prone to undue complexity where it is desired to establish priorities between the election of utility power and the supplementary source. When priorities are to be given to that supplementary or alternate source, very close maintenance of the timing system and a continued awareness of weather-atmospheric conditions must be provided. Of course, such close attention to systems which traditionally have been at best ignored by the homeowner does not represent a practical approach.

SUMMARY

The present invention is addressed to interface apparatus which maximizes the imployment of an alternate energy source such as a solar panel array, windmills, or the like. This alternate energy source is utilized to provide a recharging input to a battery storage facility preferably provided having batteries chargeable in deep cycle fashion. Beginning at the earliest commencement of available power generation by the auxiliary sources, for example at sunrise in the case of solar panels, the apparatus reacts to utilize such power by evaluating the auxiliary source voltage output and comparing it with voltage levels extant at the battery facility. Where the auxiliary source open circuit voltage so measured equals or exceeds the battery voltage levels, the control of the apparatus closes a charge switching arrangement to permit a charging operation to ensue at least for a predetermined interval, for example about one minute. Because auxiliary power sources such as solar panels are characterized in exhibiting an initial voltage level but will develop a current output only after the development of this voltage level, i.e. in response to impinging light, the apparatus further monitors the closed circuit current characteristics of the panels or source to detect the presence of such current. Where such current is not detected within the predesignated interval, then the charging relationship between panel and battery is removed. On the other hand, where the current is detected during the predetermined sampling interval, then charging is permitted to continue until such time as the batteries achieve a fully charged condition preferably at a level wherein the electrolyte is in an incipient boil condition.

The apparatus further includes a charge monitoring arrangement wherein the predetermined fully charged battery level is detected and the charge relationship between the auxiliary source and the battery is terminated. Where further energy is available from the alternate energy source at this time, then select secondary loads such as d.c. attic fans or d.c. water heating elements may be powered directly from the auxiliary source.

The battery storage facility employed with the interface apparatus of the invention is coupled with an inverter to derive an a.c. power output which may be applied to a distribution network of a facility such as a household through a distribution switching arrangement which is actuated either to employ the output of the inverter or the a.c. input from a conventional utility or the like. Monitors are installed to connect the storage battery-inverter combination with the distribution network of the facility only during periods when relatively higher voltage levels are exhibited by the battery facility. Additionally, the control arrangement of the apparatus provides for the disconnection of these batteries from distribution to the facility at select medium battery voltage levels and the simultaneous application of utility line power to that facility.

The invention also is concerned with apparatus for charging a storage battery exhibiting battery voltage values representing fully charged and predetermined chargeable conditions from an energy source having given current and levels of voltage. Further included is a charge switch actuable between open and closed conditions for electrically coupling the battery with the auxiliary source. A voltage monitor is provided for monitoring the source for voltage level and the battery voltage level when the charge switch is in its open condition; the voltage monitoring further having an enable signal when the source voltage level is at least equal to the battery voltage value. A first charge monitor is provided for monitoring the battery voltage and is provided having a charge start output when the battery voltage value represents the predetermined chargeable condition. Additionally a control is provided which is responsive to the occurrence of the voltage monitor enable signal with the first charge monitoring charge start output for transitioning from a non-charge to a charge condition to effect actuation of the charge switch to its closed condition and it is further responsive to a disable condition for transitioning from the charge to the non-charge condition to effect actuation of the charge switch to its open condition. The apparatus further includes a current detector which responds to the generation of current by the source when the charge switch is in its closed condition and which has a current detect signal in the presence of such current. A delay arrangement is provided which is responsible to the control charge condition for a predetermined sample interval, for example one minute, and which derives the disable condition at the termination of this sample interval and is responsive in the presence of the current detect signal to prevent derivation of the disable condition.

Other objects of the invention will, in part, be obvious and will, in part, appear hereinafter.

The invention, accordingly, comprises the apparatus possessing the construction, combination of elements and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 4 is a detailed electrical schematic drawing of certain of the monitoring and comparator functions of the apparatus of the invention;

FIG. 5 is a detailed electrical schematic representation of the current monitoring feature of the invention;

FIG. 6 is an electrical schematic drawing of certain of the control features of the invention;

FIG. 7 is an electrical schematic drawing of the drive circuit for one switching function of the invention;

FIG. 8 is an electrical schematic drawing of the drive circuit for another switching function of the invention;

DETAILED DESCRIPTION

The interface apparatus of the instant invention serves as a unique control in conjunction with the efficient employment of alternate energy sources such as photovoltaic solar panels, windmills, and the like. Rather than operating in conjunction with a conventional timer which assumes the availability of energy from these alternate energy sources, the interface apparatus continuously monitors the alternate source for available energy and then selectively applies that monitored energy to a battery storage medium. Control over this charging of the deep cycle battery medium is such as to maintain these relatively costly components in a condition enhancing their lifespan. To maximize the employment of alternate energy, where the capacity of the battery storage media is fully employed, then the system diverts energy from the alternate energy source into secondary load facilities suited for accepting randomly available power such as hot water heaters or attic fans or the like.

Figure 1:
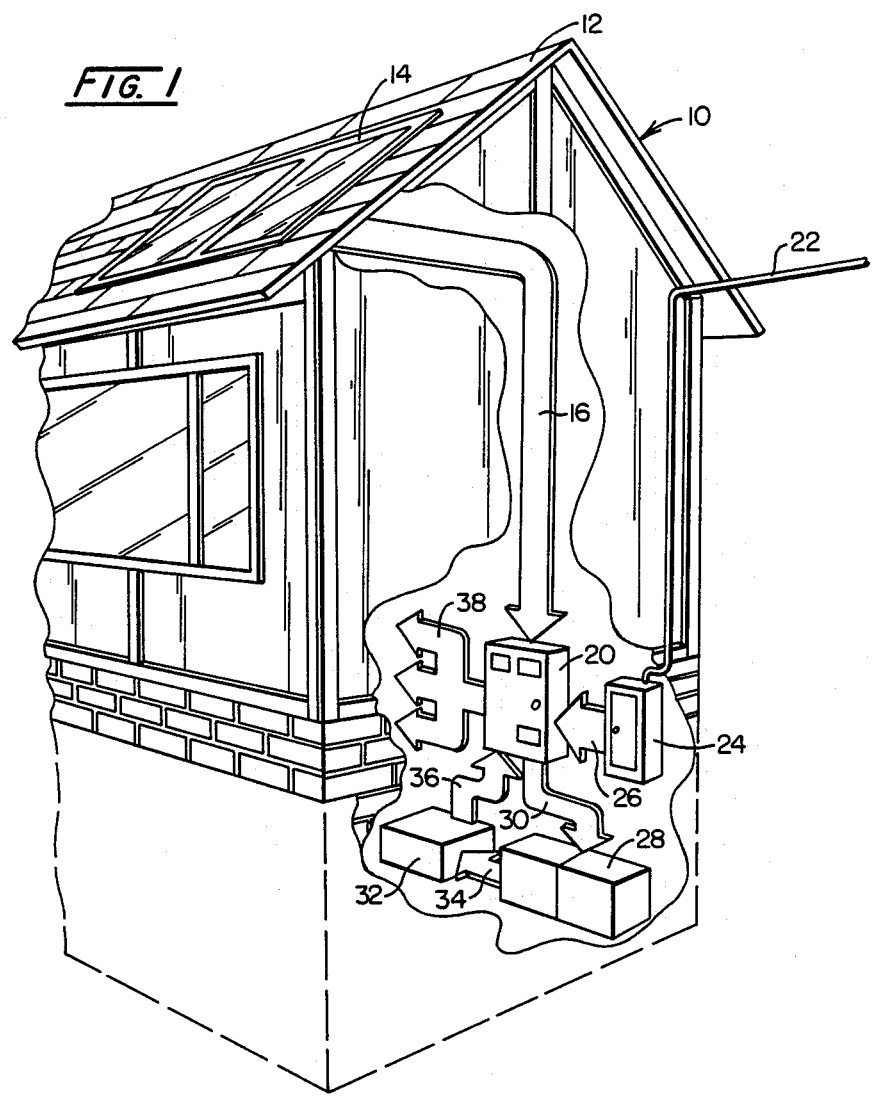
FIG. 1 is a perspective view of a building incorporating the apparatus of the invention with portions broken away to reveal internal structure.

Referring to FIG. 1, a schematic representation of a building employing the apparatus of the invention is represented generally at 10. The roof 12 of building 10 is shown supporting a pair of photovoltaic or solar panels 14 which, when activated by the sun, will constitute a power supply which is tapped as represented by the arrow 16 and directed to the housed interface apparatus 20. Apparatus 20 further responds to an a.c. utility input as represented by power line 22 and introduced into a distribution box or power company grid 24. The association between this utility input and the interface apparatus at 20 is represented by the arrow 26. Apparatus 20 responds to the input of power from the panel 14 to maintain a relatively high charge status at a battery storage installation 28 as represented by arrow 30. Deep cycle batteries employed in installation 28 are readily available in the marketplace and are characterized in being capable of being repeatedly completely discharged and recharged essentially without damage. To enhance the longevity of these batteries, full discharge of the batteries is not permitted and they are subjected to a pulse type charging as opposed to conventional trickle charging and the like. In particular, the batteries, as located at 28, are charged and their terminal voltage is monitored as it rises in correspondence with the amount of energy supplied thereto. After the battery has reached nominal full charge, the charging may continue and the terminal voltage may rise until the gassing potential (lead acid battery) of the electrolyte is reached. At this point, referred to herein as the "fully charged" condition, charging is terminated. Where charging would continue above the gassing potential, the storage batteries will lose electrolyte to thus deteriorate battery output and engender destructive exposure of the electrodes thereof.

The direct current output of the battery storage installation 28 is directed to the input of an inverter 32 as represented by arrow 34. Inverter 32 functions in conventional fashion to convert the d.c. output of the batteries to an a.c. output, as represented at arrow 36 which, in turn, is directed to the interface apparatus 20 for selective application to select networks of the circuits of building 10 as represented by the multiple arrow 38. The apparatus 20, in effect, prioritizes the distribution of power, a first priority being associated with the implementation of the power available from panels 14 or some other suitable alternate energy source such as a windmill. Where the batteries of the facility 28 are fully charged and supplying power to the home through the network 38 and additional power is available by virtue of the fully charged status of the batteries at 28, then secondary loads are powered from the panels 14. Such loads may, for example, be d.c. motor powered attic fans or may be constituted by a d.c. heater element within a hot water heater system.

Figure 2:
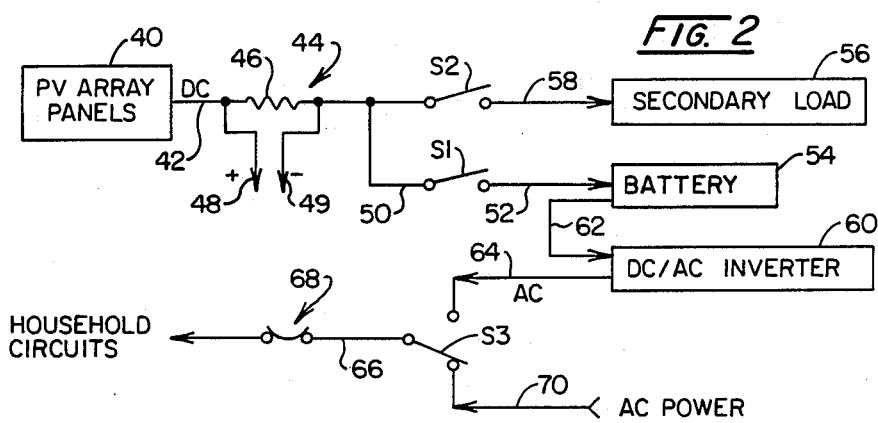
FIG. 2 is a schematic representation of the load, source and switching functions associated with the apparatus of the invention.

Referring to FIG. 2, a generalized schematic diagram of the switching functions carried out by the apparatus 20 is provided. In the figure, the solar or photovoltaic array of panels is represented at block 40 and is shown providing a direct current and voltage categorized output at line 42. Incorporating within this output at line 42 is a panel current detector shunt represented generally at 44 and including a shunt resistor 46 and current monitoring readout lines 48 and 49 which provide a voltage value proportional to current output from the panels 40. Solar panels, in particular, exhibit certain operational characteristics which must be accommodated for in any energy utilization system. For example, when the panels are coupled in direct charging relationship with a storage battery, their output voltage can no longer be monitored without interruption of that connection, inasmuch as their voltage will assume that of the batteries. In accordance with the instant invention, in order to determine that the panels are still capable of generating power, i.e. that they are still capable of charging the batteries, their current generating characteristics are monitored by the shunt 44. So long as the panels as at 40 are generating current, an analog signal will be developed from the shunt 44 output lines 48 and 49. Of course, where the panels 40 are not connected in charging relationship with the batteries, then their output voltage readily may be monitored, for example, to determine whether the voltage levels which they generate will be suitable to carry out battery charging.

Another aspect of the performance characteristics of such solar panels as at 40 resides in their tendency to generate a voltage level before discernible current generation occurs. This phenomenon generally is witnessed during the start-up periods of their performance, for example, in the early morning as the sun commences to rise. Accordingly, the current monitoring function may be employed to monitor the onset of current generation of the panels.

The output at line 42 is shown directed via line 50 to a switch identified as S1 and by a line 52 to the storage battery represented at block 54. The switch S1 preferably will take the form of a fast acting relay. Where battery function 54 exhibits a fully charged status and sufficient power remains for further utilization from the panel array 40, then a switch represented at S2 is actuated to power a d.c. secondary load represented by block 56 via line 58. As noted above, the secondary load as at 56 may be provided as a d.c. heating element for a water heater device, a d.c. motor driven attic fan, or the like. Switching S2, as before, preferably is provided as a relay.

Battery 54, when exhibiting a suitable voltage level intermediate a predetermined chargeable condition and its fully charged voltage value, is employed to drive a d.c. to a.c. inverter as represented at block 60 by association therewith as represented at line 62. Direct current input to inverter 60 is converted to an a.c. output at accepted frequencies, for example 60 Hz, as represented at line 64, and is applied or patched to the household or user facility circuits through a switch represented at S3 and line 66. Line 66 represents the distribution into the various network of household circuits and is seen to incorporate a circuit breaker 68. Switch S3 generally is provided as a multiple-pole relay switch and in the orientation shown will supply utility power via line 70 where the prioritized auxiliary power input is incapable of supplying that power. The logic by which the switches S1–S3 are actuated is set forth in the discourse to follow.

Figure 3:
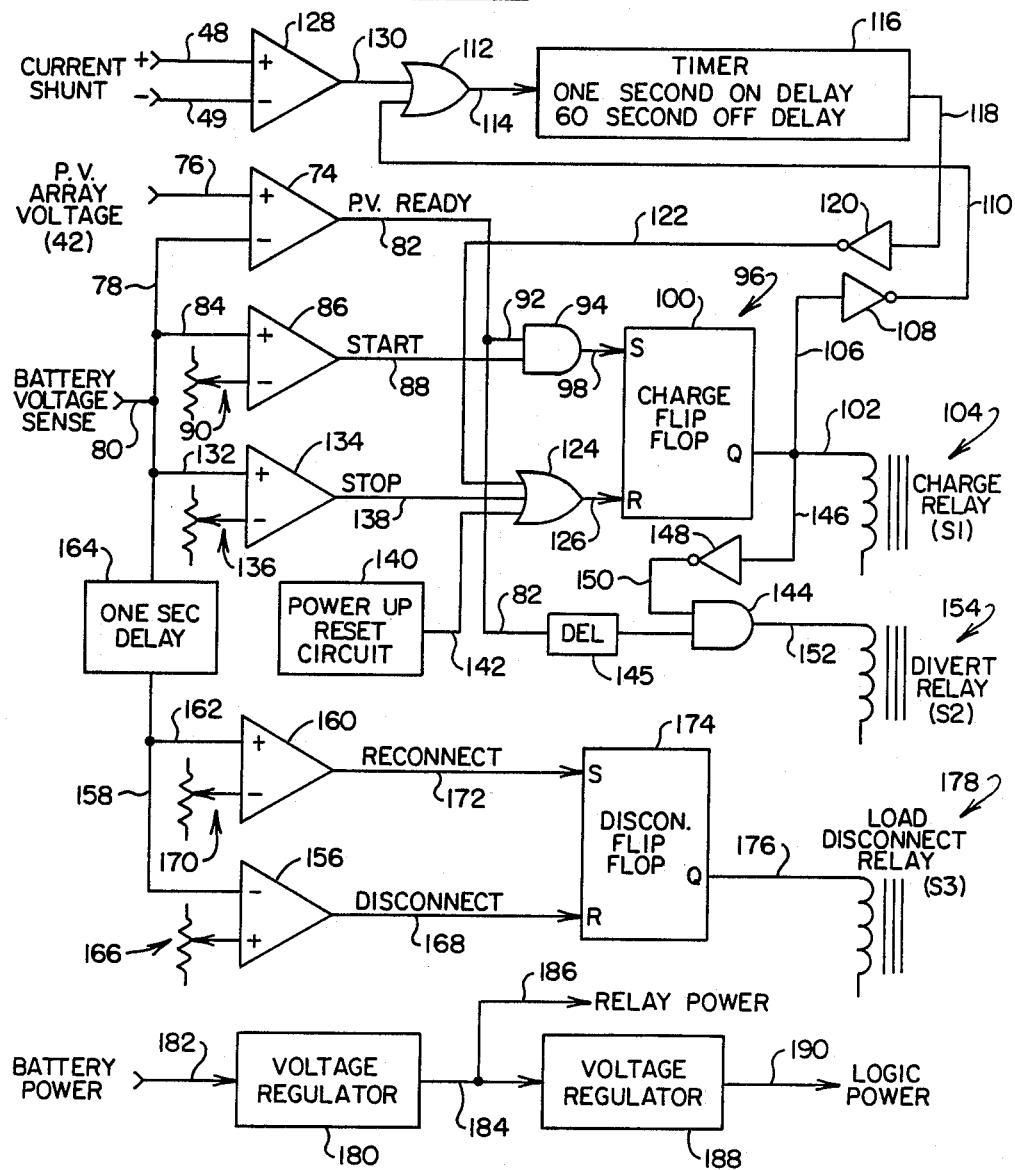
FIG. 3 is a schematic representation of the functional components of the apparatus of the invention.

Looking to FIG. 3, a general overview of the overall control asserted by the interface apparatus of the invention is provided in schematic fashion. In the figure, the open circuit voltage of the photovoltaic array 14 is seen to be monitored by a comparator represented at 74 and having one input represented at line 76 configured to convey the voltage output of the panel array 14. Of course, this same output can carry the voltage levels of any power sources such as a windmill or the like. The opposite input to function 74 is represented at line 78 which serves to carry the instantaneous level of battery voltage as derived from the battery installation 28 as represented at line 80. Thus, the comparator 74 functions as a monitor which looks to the output voltage of the auxiliary power supply and to the instantaneous voltage values of the batteries to provide an enable signal identified as "P.V. READY" at output line 82. This enable signal at line 82 will be present when the source voltage level at line 76 is greater than or equal to the battery storage voltage value at line 78. The logic arrangement of the control features of the invention will be seen to employ this enabling signal at line 82 in a manner wherein the source voltage compared at line 76 is an open circuit voltage detected when the switch S1 is open.

Battery voltage sensed via line 80 and transmitted from line 78 also is directed through line 84 to a charge start comparator 86 which functions to develop a charge start output at line 88 identified as "START", indicating that the battery installation 28 is at a voltage level wherein charging should commence. It may be recalled that this level preferably is relatively high, amounting essentially to the battery rest value, a predetermined chargeable condition which may, for example, be typically selected as 13.5 volts in a system wherein the fully charged condition at the point of incipient electrolyte boil is about 14.5 volts. The performance of comparator 86 is adjusted by a potentiometer containing divider network represented schematically at 90 and the output at line 88 of this charge monitoring function is directed along with the P.V. READY signal at lines 82 and 92 to an AND gate 94 of a control circuit generally represented at 96. Accordingly, with the presence of an enable (P.V. READY) signal at line 92 and a CHARGE START output at line 88, the output of AND gate 94 at line 98 assumes an active high status which is directed to S terminal of a flip-flop 100. As a consequence of this input, the Q output terminal thereof or its equivalent, assumes a logic high value which is employed through appropriate driver circuitry to energize the inductive components 104 of a charge relay described as switch S1 in FIG. 2. Energization of these inductive components effects the closure of switch S1 and the coupling of solar panels 40 (where sun activated devices are employed) with the battery installation 28. As noted earlier, it is a characteristic of solar panels that a voltage will be developed across them quite quickly as the sun first rises, however, adequate current often is lagging in such development. Inasmuch as the switch S1 is closed, the control feature of the invention then commences to assume that the array of panels 40 is generating current for a predetermined sample interval, selected for example as 60 seconds. In the latter regard, it may be observed that the logic high value at line 102, effecting the closure of switch S1, is monitored at line 106 and inverted at inverter 108 to be presented along line 110 to an OR gate 112. The output of OR gate 112 is provided at line 114 and is directed to a timer logic represented at block 116 which, in response to the logic low input from line 114, provides a logic high output at line 118 which is inverted at inverter 120 and the resultant signal is directed along line 122 to an OR gate 124. During a sample time-out interval, the output of OR gate 124 at line 126 is a logic low which is directed to the reset, R, terminal of flip-flop 100. Therefore, during the 60 second delay, the logic high value at the Q terminal of flip-flop 100 remains high to attain the closed status of the charging relay switch S1. During this same period of time, the current generated by the array of photovoltaic panels 40 is monitored by the current detect monitoring shunt 44 (FIG. 2), a current being developed across lines 48 and 49, which are reproduced in FIG. 3, at such time as a current is detected. This voltage is directed to amplification stage 128, and a logic high signal corresponding therewith is presented along line 130 to another input to OR gate 112. It may be observed, therefore, that current is monitored by the apparatus of the invention at such time as the charge relay represented by switch S1 is in a closed status. By comparison, the voltage level of the array of panels 40 is monitored for operational purposes at such time as that same switch S1 is in an open comdition.

In the event that there is no logic high signal at line 130 representing a detection of current at the photovoltaic array of panels 40, the timing function at block 116 will continue until the expiration of 60 seconds. Where no current is detected, at the termination of this sample interval, the signal at line 118 transitions to a logic low, whereupon its inverted complement is directed along line 122 to OR function gate 124 to effect the development of a resetting signal at line 126 to terminate the charge condition activation signal at line 102. Accordingly, line 102 transitions to a non-charge condition and the inductive components 104 of the charge relay switch S1 are de-energized and the switch opens to thus avoid any back current phenomena. This back current avoidance is achieved without resort to serially disposed blocking diodes and the like. The timing function at block 116 will not permit the switching function S1 to reclose for an interval of, for example, one second, assuming the enable signal at line 92 and the charge start output at line 88 are of appropriate logic values for re-activating the set input to the flip-flop function 100. If during the 60 second sample delay time-out at block 116, current is detected across lines 48 and 49, then the resultant logic high level at line 130 is directed through line 114 to the timing function at block 116 to provide a logic high value at line 118 which permits maintenance of the closure status of switch S1. The battery thus is charged from the photovoltaic array of panels 40 until such time as cargo stop logic terminates that activity. To carry out the latter function, the battery voltage value, as monitored at line 78, is directed via line 132 to one input of another charge monitor or comparator represented at 134. The reference input to comparator 134 is derived from a potentiometer containing divider network represented generally at 136. A setting for network 136 is preferably at the fully charged condition for the batteries within the battery installation 28. Typically this value will be selected as the earlier-noted 14.5 volts or just at the incipient boiling point of the battery electrolyte. The output of the monitoring function represented at comparator stage 134 is asserted along line 138 as a "STOP" charge output and is directed to another input to the OR function or gate 124. Thus, with the development of the charge value at the battery installation 28 at which an incipient electrolyte boiling point is reached, the flip-flop function 100 is activated to open the switch S1. In general practice, the batteries being charged will reach this fully charged condition and then drift downward toward a rest position and the result of the control 96 operation is to effect a charge pulsing of the battery function until the batteries therein tend to hold that fully charged condition. Thus, the pulse charging thereof will be of shorter duration and gradually taper off as the batteries reach and become stable at their fully charged condition. This technique for charging is seen to maintain the batteries at relatively high levels over their operational lifespans and to charge them only when required. As a consequence of this feature and the charge disconnect feature described later herein, significantly improved battery lifespans can be realized. Further, the charging is only upon demand as opposed to trying trickle charging techniques and the like.

The opening of switch S1 also takes place at such time as the apparatus is powered up. In this regard, upon power up, a power up reset circuit represented at block 140 provides a logic high output at line 142 which is directed to another input of the OR gate 124. Accordingly, upon power up, assurance is made that the switching function coupling the battery with the source of energy is open. This reset operation represents a safety feature having important significance for systems employing windmills as the auxiliary power source. Windmills typically will "motor" when direct current power is applied to them. In the event installation or maintenance personnel are working at the facility of the windmills, activating the standard charge controller system accidentally during that period could cause injury.

Where the batteries of the battery storage installation 28 are fully charged or otherwise adequately conditioned to supply all of the loads required by the conventional distribution networks 38 of the facility being powered, then any further power available may be diverted to secondary loads as described at block 52 by switching switch S2. Control 96 carries out this secondary load energization by a ANDing of the enable signal representing an adequate voltage at the energy source as at line 82 with the inverted logic representing the opening (non-charge condition) of the charge relay switch S1. Accordingly, an AND gate 144 rceives the input at line 82 representing an enable signal from the energy source along with the inverted value of the switch S1 status at line 102, as represented by line 146, inverter 148, and line 150 to develop an operation intended to carry out the energization of secondary loads. However, particularly where solar panel alternate energy sources are employed, a condition may exist in the twilight hours wherein the connection of such a secondary load by the closure of the switch S2 will "pull" the voltage of the solar panel as monitored at line 76 to a level below the battery voltage as sensed at line 80. When this occurs, the P.V. READY signal or enable signal at line 82 is removed. Without correction, this condition will cause a "chatter" or "hunting" effect at the switch S2 which, when implemented as a relay, will engender excessive cycling to limit its operational lifespan. To overcome this undesirable effect, a duly timed delay is imposed as represented by a block 145 in line 82. This function as represented at block 145 imposes a 60 second delay off status such that the enable signal at line 82 remains available notwithstanding the noted drop of panel voltage for at least that first interval. The delay at block 145 further provides about a one second delay to permit an evaluation of open circuit solar panel voltage by stage 74 on the occasion of switch S2 opening.

Looking to the actuation of switch S2, it may be observed that the output of the gate at line 144 is provided at line 152, which performs through appropriate driver circuitry and the like to energize the inductive components 154 of a divert relay activating the switch S2 described in conjunction with FIG. 2. In effect, this actuation of divert switch S2 occurs in response to the enable signal (P.V. READY) at line 82 ANDed with the charge stop output (STOP) at line 138.

The apparatus of the invention further performs as described in conjunction with FIG. 2, to disconnect the auxiliary power source from powering activity at such time as the power available from the batteries is no longer adequate. At such times, the system operates to switch to utility derived power as described in conjunction with line 70 on FIG. 2. Accordingly, the sensed battery voltage at line 78 is shown directed to a disconnect monitoring comparator 156, the battery sensed input to which is provided at line 158. In similar fashion, a reconnect function is represented by a comparator 160 having its battery sense input deriving from line 158 via line 162. Line 158 is provided at the output of a one second delay network represented at block 164, the input to which is derived from the battery voltage sense line 78. Monitoring or comparator 156 is adjusted by a potentiometer containing divider network 166 at its opposite input such that it will provide a "DISCONNECT" output signal at line 168 at such time as the monitored battery voltage is at a predetermined low disconnect value. For example, this value may be selected as about 10.7 volts. On the other hand, the auxiliary load may be reconnected to the system by virtue of the setting of comparator 160 through adjustment of its comparator input provided by a potentiometer containing divider network 170, the output of which is directed to its opposite input. The resultant connect signal at line 172 will be a logic high value at such time as the sensed battery voltage reaches a predetermined connection value, for example, the rest or chargeable condition value of about 13.5 volts. Line 172 is shown directed to the set, S input terminal of a flip-flop represented at 174, the effective Q terminal output of which is represented at line 176. Line 176, in turn, is shown directed to the inductive components 178 of a load disconnect relay represented by switch S3 (FIG. 2). The relay will be energized to close the pole switch S3 against the earlier-described inverter output line 64 (FIG. 2) upon receipt of a reconnect signal from line 172 to flip-flop 174. On the other hand, the switching function S3 will couple utility derived a.c. power into line 66 of the facility circuits (FIG. 2), upon receipt of a disconnect signal at line 168 at the reset terminal (R) of flip-flop function 174. This will cause a logic low value to occur at line 176 to de-energize the inductive components 178 of switch S3 and effect the disconnect operational function described above. The one second delay network 164 is provided for the purpose of permitting the sensed voltage at line 78 and resulting at line 158 to be gradually asserted or rise slowly. Thus, the disconnect output at line 168 will be activated initially at any start-up such that a.c. power is applied and the system will then revert to prioritize auxiliary power at such time later as the reconnect output logic at line 172 is developed. As is apparent, the adjustment of networks 166 and 170 may be developed so as to ensure the priority of utilization of auxiliary power sources such that the utility power will be employed simply for fill-in purposes.

The power supply for the logic components of the apparatus of the invention is developed from a high speed switching form of regulator. This regulation is represented as an initial voltage regulator stage at block 180 which is shown receiving battery power from along line 182. The preregulated output of switching voltage regulator 180 is seen provided at line 184 which is tapped at line 186 to provide drive power for the relay inductive components described earlier at 104, 154, and 178. Line 184 also is directed to the input of a second stage voltage regulator represented at block 188 which functions to supply logic component power as represented at line 190. The apparatus may be used with any common d.c. battery voltage by plugging in modular programming resistors which, when appropriately selected, serve to adjust various voltage divider networks for appropriate calibration of the system.

In the remaining figures of the drawings, an embodiment for a control circuit carrying out the functions as described in conjunction with FIGS. 2 and 3 is revealed. While the particular logic levels heretofore discussed may be varied in these detailed embodiments, functional operation remains essentially the same. Looking to FIG. 4, the photovoltaic array or similar source voltage output described in conjunction with line 76 in FIG. 3 again is reproduced as being directed through a resistor-divider chain comprised of resistors R1 through R3 coupled in series between line 76 and ground. Resistor R2 of this grouping may be provided as a plug-in programming resistor selected for the particular battery or array characteristic involved. The divider network including these resistors, as represented generally at 202, is tapped by line 204 which is introduced to the negative terminal of an operational amplifier 206 configured to carry out the comparator function represented earlier at 74. A capacitor C1 is coupled between line 204 and ground to filter transients or other spurious signals. The opposite input to the stage 206 is provided at line 208 which carries a voltage representing the instantaneous voltage value of the battery bank. In this regard, the earlier-described line 80 carrying this signal again is reproduced and the voltage value of the battery facility is shown being introduced from line 80 into a divider network 210 incorporating resistors R4–R6. As before, resistor R5 is provided in plug-in fashion to readily accommodate the apparatus to any given battery system employed. Network 210 is tapped at line 212 which extends, in turn, to line 208. A capacitor C2 is coupled between line 212 and ground to filter spurious signals and other transients.

With the arrangement shown, the comparator stage 206 receives signals at lines 204 and 208 corresponding, respectively, with the source voltage and battery voltage to provide an output at line 214 representing a logic true low condition identified as "P.V. READY" at such time as the auxiliary power or solar panel array voltage and battery voltage are equal. The signal at line 214 also is directed via line 216 to an inverter 218 to provide a P.V. READY signal at line 220. However, as noted at block 145 in FIG. 3, to avoid hunting derived chatter effects which otherwise may be witnessed, for example, at twilight hours when solar panels are employed for secondary load diversion, a delay arrangement is imposed in developing the PV READY signal. This delay is provided by the network 145 comprising diode D17 and resistor R48 in line 216, parallel coupled resistor R49 within line 217, and timing capacitor C11 coupled between line 216 and ground. In operation, when line 214 transitions to a logic high level, capacitor C11 is charged through resistor R49 over about a 60 second interval. Correspondingly, when line 214 transitions to a logic low level, capacitor C11 is rapidly discharged through resistor R48 and diode D17, an operation requiring about one second. These imposed delays prevent "chatter" phenomena at the divert switch (relay) S2 and improve its lifespan characteristic. As noted above, when the secondary load 56 is applied, voltage levels may immediately drop to an extent which, without the above correction, would cause the switch S2 to immediately open. The one second delay permits a short testing of panel voltage.

The battery's charge stopping function is represented in FIG. 4 by the comparator stage 134 as described above. It may be observed that the adjusted voltage value of the battery installation at line 208 is directed via line 222 to the negative terminal of an operational amplifier 224 configured as a comparator. The charge stopping value input to the amplifier 224 is provided from line 226 which is directed to the wiper arm of a potentiometer P2. Potentimeter P2 is the center impedance of a divider network represented generally at 228 which includes resistors R7 and R8 coupled within the network between +8 v, the logic power supply, and ground. As indicated earlier herein, the command to stop charging the batteries is carried out at or near their fully charged status which approaches the incipient boiling point of their electrolyte. The output of comparator stage 134 is provided at line 230 which is shown carrying a $\overline{\text{STOP}}$ signal representing a STOP output.

The charge start output is generated by a comparison procedure again indicated generally at 86, and including an operational amplifier 232 serving as a comparator, the positive terminal of which is coupled to receive the adjusted battery sense value from line 208. The opposite or negative terminal input to the amplifier 232 is directed via line 234 to the wiper arm of a potentiometer P3 which, serving with resistor R9, is coupled within line 236 between line 226 and ground. Thus, the point at which battery charging starts always will be selected at some value below that value at which battery charging ceases, as defined at line 226. The output of comparator or amplifier stage 232 is provided at line 238 which is shown carrying a "START" signal.

Referring to FIG. 5, the auxiliary power source current sensing function is revealed in enhanced detail. In the figure, the output from this power source again is represented at line 42 which is directed, as labelled, to the relays or secondary load and battery supplied, respectively, from switches S2 and S1 described in FIG. 2. The shunt resistor remains identified as 46 and may be provided, for example, as a 0.002 ohm resistor. Shunt lines 48 and 49 are reproduced as being directed to the positive and negative terminal inputs of an amplification stage 128 in effect, performing as a comparator and identified, in particular, as an operational amplifier 24. An offset adjustment for the amplifier is provided by potentiometer P4, the wiper arm of which is coupled to line 242 through Zenner diode D1 to the panel array output line 76. Diode D1 serves to stabilize voltage cross amplifier 240. In the presence of a detected voltage across lines 48 and 49, amplifier 240 will develop an active low signal at its output line 244. Line 244 is coupled through base resistor R10 to the base of a PNP transistor Q1. The emitter of transistor Q1 is coupled with the array voltage at line 76, while the collector thereof is coupled to line 246 carrying resistors R11, R12, and diode D2 in series relationship, the grouping being, in turn, coupled to line 248. Line 248 extends to the reset terminal of a delay defining counter represented at block 250.

It may be observed that power is supplied to the amplification stage 240 from the source or solar array itself. In this regard, line 242 is shown to be coupled to the voltage input line 76 through Zenner diode D1. Regulation at this line further is achieved by the resistor chain at line 252 incorporating resistors R13 and R14 and coupled to ground. Selection of values for resistors R13 and R14 is made in conjunction with the type of energy source available. Adjustment of the sensitivity of the amplification stage is carried out at potentiometer P4 to permit it to respond to early morning or twilight performance of the system. Where a current is detected by the amplifier 240, its output at line 244 will be an active low signal. This operates to turn on transistor Q1 which, in turn, develops a high signal value at line 246 which is adjusted by the selection of values of resistors R11, R12, and diode D2. A second diode D3 is coupled to +8 v logic supply through line 254 which is connected, in turn, intermediate resistor R12 and diode D2. Diode D3 serves a clamping function to guarantee that the counter 250 does not "see" more than an 8 volt signal level. The resultant logic high signal as treated by resistors R11 and R12 is submitted via diode D2 to line 248 to effect a resetting of the counter 250 at its R terminal. Diode D2 cooperates in concert with another diode D4 within line 256 and a resistor R15 to provide an OR function. Line 256 and diode D4 will be observed to carry a $\overline{CHR}$ signal described later herein but corresponding with the earlier-described charge signal input to timer 116.

Counter 250 of the timer 116 is driven from an oscillator network 258 which includes a Schmitt trigger 260 which performs in conjunction with resistor R16 and capacitor C3 to provide a clock output at line 262 directed to the clock input of counter 250. Counter 250 is tapped at a select stage thereof, for a example stage Q14 represented herein as "Q", to achieve a one minute output time delay dependent upon the frequency of the signal asserted at its clock input C via line 262. This output is represented at line 264 and will remain low during the counting interval or during such time as a logic high reset input is provided at line 248. The output at line 264 is inverted at inverter 266 to provide a logic high output at line 268 representing either the presence of current at the array source or an interval of one minute time-out at counter 250. This signal is shown labelled "P.V. CURRENT". Timing 116 operates in conjunction with the OR inputs either at line 256 or emanating from line 246. Line 256 is normally at a logic high and will assume a logic low upon the occurrence of a $\overline{CHR}$ signal representing an ANDed P.V. READY and START input as described in conjunction with FIG. 3. Thus, with the assertion of the $\overline{CHR}$ signal, line 248 is at a logic low and counting commences under the additional condition that no auxiliary source current is available as sensed at stage 128. The resultant low logic level at line 264 is inverted at inverter 266 to provide a P.V. CURRENT signal at line 268 which is at a logic high. This signal continues until time-out by the enabled clock drive 258. At the termination of a one minute interval, assuming no reset signal has been received by the counter 250, line 264 transitions to a high which is inverted at inverter 266 to provide a logic low signal at line 268. The logic low signal at line 268 disables the counter 258 through diode D5. However, should current be sensed during the counting interval, then a logic high signal will be asserted at line 248 through diode D2 to immediately reset counter 250 and retain a logic low level at line 264 which sustains the corresponding logic high signal at line 268 and the P.V. current signal. A one second "on" delay for the instant timing function is provided by an R-C network 268 including resistor R27 and capacitor C6. With the transition of signal level at line 264 to a low level, a one second delay will ensue before that level will be witnessed in inverted fashion at line 268. This one second sampling delay serves to hold the switch S1 "open" until the open circuit voltage evaluating stage 74 has time to respond to this switching activity.

Turning to FIG. 6, (adjacent to FIG. 4) portions of the control function 96 are set forth in more enhanced detail. In the figure, the ANDing function discussed at gate 94 in FIG. 2 is represented as a structure comprised of diodes D6, D7 and resistor R17 in a configuration represented generally at 280. The anode at diode D6 is coupled to line 214 which carries the logic low true signal $\overline{P.V. READY}$, while the anode of diode D7 is coupled to line 238 which carries the logic low true $\overline{START}$ signal. Thus, both of the signals at lines 214 and 238 must be at a logic low value to provide a corresponding low at set line 282. Set line 282 leads to the equivalent of the S terminal of a flip-flop which is here shown generally at 284 configured in the manner of a cross-coupled R-S latch. Latch 284 includes two cross-coupled NAND gates 286 and 288, the set input to which has been described at line 282, the reset input to which is provided at line 290, while the output thereof is identified at line 292. The latch 284 functions to retain the identity of the state of the charging relay or switch S1 during periods wherein battery voltage is between a stop and start charging set point. Assuming the presence of a combined logic low at lines 214 and 238, the resultant output at line 292 is a logic low true which is reflected at line 294 to carry the signal "$\overline{CHR}$". This same signal is inverted at inverter 296 to provide the corresponding logic true high signal "CHR" at line 298.

Latch 284 may be reset by logic low inputs at line 290 emanating from an AND gate 300 coupled to receive the logic true stop charging signal labelled $\overline{STOP}$ or the corresponding low true logic level from line 302 which carries the output of either a power up reset circuit, represented again in general at 14, or the P.V. current signal from line 268 (FIG. 5). In this regard, line 302 represents the output of an AND gate 304 which receives one input line via 306 having a logic high value in the presence of photovoltaic current and a low transition from that logic high in the event that no current is produced. To avoid causing the relay represented by switch S1 to close immediately upon power up, the reset circuit 140 provides a short delay dependent upon the time constant represented by the charging of capacitor C4 through resistor R18 at line 308. Line 308 is tapped intermediate the timing components by line 310 leading to gate 304 and a diode, D8 provides for the fascile discharge of capacitor C4. As is apparent, line 310 will remain low until such time as the capacitor has charged to reach a logic high level which is asserted from line 310. It may be observed that AND gates 300 and 304 combine to evolve a three-input OR gate function.

The P.V. current signal at line 268 emloyed in conjunction with gate 304 also is combined in ANDed logic fashon with the CHR signal at line 298 from latch 284 at an AND gate 312 to provide a CHARGE signal command at line 314 as well as the inverted version thereof via line 316, inverter 318 and line 320.

The flip-flop form of logic provided by latch 284 provides a flexibility for switching relay design. For example, a two coil latching type relay which latches in either of two positions, once energized and de-energized, may be employed with this circuitry approach. With the utilization of such relays, consumption of current is reduced.

Referring to FIG. 7, the driver circuit for the switching relay inductive components 104 representing switch S1 is portrayed. It may be observed that the CHARGE signal at line 314 is directed through a base resistor R19 to NPN Darlington coupled transistors Q2. The emitter of this transistor pair is coupled to ground, while the collector thereof is coupled via line 322 to one side of the inductive winding of the inductive components 104 of switch S1. The opposite side of the inductive components, as well as line 324, are coupled to a +12 v regulated power supply. Line 324 incorporates a diode D9 employed to accommodate for inductive spikes occurring during switching operations. A light emitting diode (LED) 326 is shown coupled within line 328 incorporating resistor R20 to provide a visual indication of relay energization and connection of the auxiliary source with batteries in a charging relationship.

Looking to FIG. 8, similar fashion, the P.V. READY signal at line 214, showing that the solar panels have adequate voltage, is logically ANDed with a logic low true charge signal at line 320 and AND gate 329. Thus, a logic high output is provided at line 330 on the occasion of the termination of a charge signal at line 320 and the presence of adequate voltage at the panel array, as represented by a logic high level at line 214. This logic high true signal at line 330 is directed through base resistor 421 to the base terminal of a Darlington connected PNP transistor pair Q3, the emitter of which is coupled to ground and the collector of which is coupled with line 332. Line 332, in turn, is directed through the inductive winding of a switch driving relay winding represented generally at 154, the opposite end of which is coupled to a regulated +12 v. Relay winding 154 serves to drive the load diverting switching function described earlier at S2. Line 332 additionally is coupled with line 334 carrying a diode D10 serving to ameliorate inductive transients occasioned by the windings at 154. Line 336 is coupled about diode D10 which incorporates a light emitting diode (LED) 338 and a current limiting resistor 422. LED 338 is energized at such time as the auxiliary source is powering a secondary load.

Figure 9:
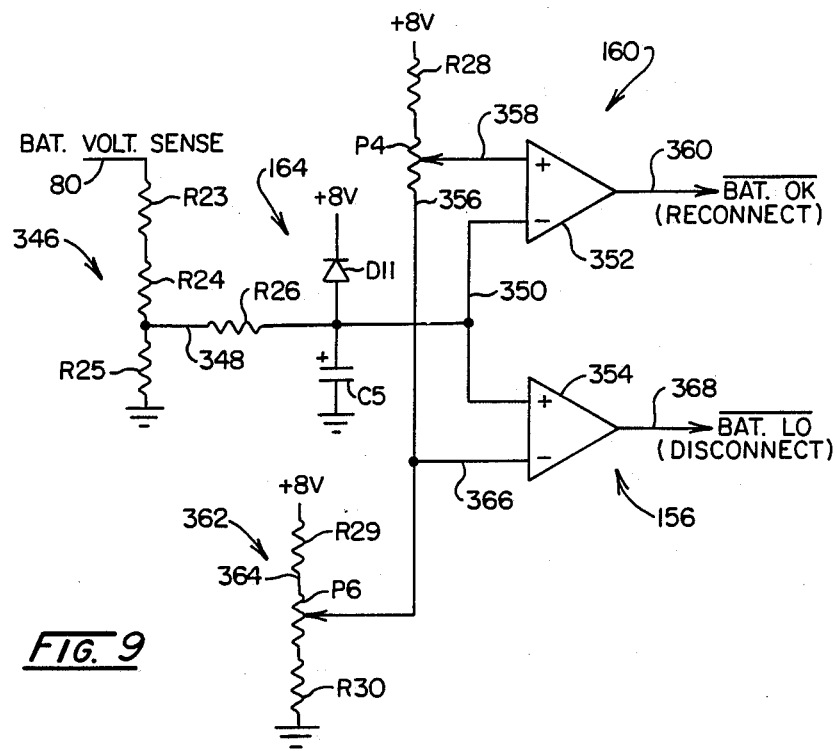
FIG. 9 is an electrical schematic drawing of the charge monitoring components of the invention.

Referring to FIG. 9, the logic or control circuitry for carrying out the activation of switch S3 is revealed in enhanced detail. In the figure, the sensed battery voltage as described in conjunction with FIG. 6 at line 80 again is reproduced and is shown leading into a divider network shown generally at 346. Network 346 includes resistors R23, R24 and R25 of which a resistor, such as at R24, may be provided by appropriate plug-in devices to accommodate the system of a given voltage level. The network 346 is tapped by line 348 which receives the scaled voltage level thereat and submits it to a one second timing R-C timing network earlier described at 164 and represented generally by that numerical designation in this figure. R-C network 164 includes resistor R26 and capacitor C5 which serves to impose the noted one second delay and gradual voltage development upon the signal as it is directed via line 350 to comparator stages provided as operational amplifiers 352 and 354. A fast recovery diode D11 coupled to +8 v is also coupled with line 348 to effect the fast discharge of capacitor C5 to achieve improved product safety. The above timing functions have been described in conjunction with FIG. 3 at block 164 which numeration is provided additionally in the instant figure.

It may be recalled that stage 352 has been described at 160 as being one wherein the battery installation is connected with a household or facility load. The reference voltage for determining this voltage level is determined by resistor R28 and potentiometer P4 connected between +8 v logic supply and ground within line 356. The wiper arm of potentiometer P4 is coupled via line 358 to the plus terminal of amplifier-comparator stage 352 to provide a logic low true $\overline{\text{BAT OK}}$ signal at line 360 for effecting a connection of the batteries with the primary load. A comparison level for the disconnect stage represented at operational amplifier 354 is set by a divider network shown generally at 362 and including resistors R29 and R30 along with potentiometer P6 which are coupled within line 364 between +8v logic supply and ground. The wiper arm of potentiometer P6 is coupled to line 356 which, in turn, is connected via line 366 to the negative terminal of amplifier comparator stage 354. Accordigly, when the batteries exhibit a predetermined low level of charge, the output of stage 354 at line 368 assumes a logic low true, as labelled $\overline{\text{BAT LO}}$.

Figure 10:
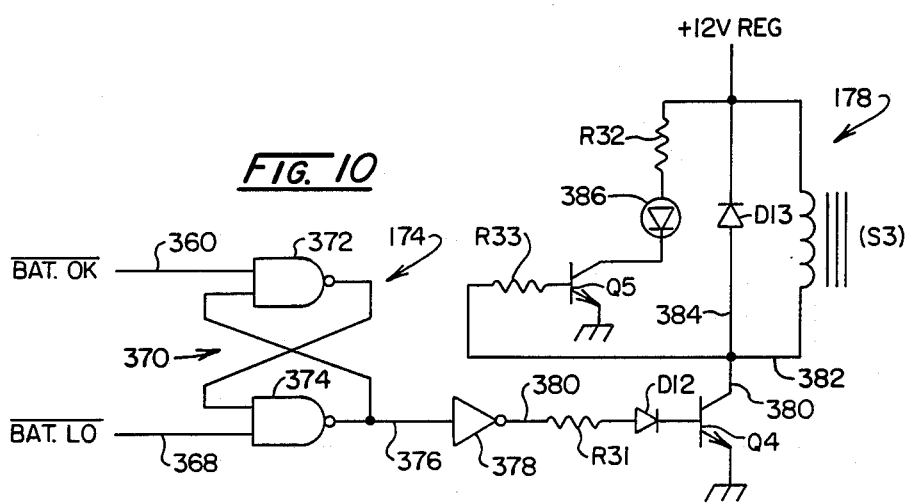
FIG. 10 is an electrical schematic drawing of control features and drive circuits for the load switching components of the invention.

Referring to FIG. 10, line 360 carrying the $\overline{\text{BAT OK}}$ signal and line 368 carrying the $\overline{\text{BAT LO}}$ signal are reproduced as leading into the respective S and R inputs of a cross-connected R-S latch represented generally at 370. Latch 370 is configured in conventional fashion to include cross-connected NAND gates 372 and 374 and serves to provide an output at line 376. The latch 370 operates to provide the function described earlier herein at flip-flop 174 in conjunction with FIG. 3. Signals at output line 376 are buffered and inverted by gate 378 which provides a signal at line 380 which, in turn, is coupled with the base of NPN transistor Q4. Line 380 also contains a base current limiting resistor R31 and a diode D12 functioning to protect transistor Q4 from being forward biased due to spurious signal phenomena. The emitter of transistor Q4 is coupled to ground, while the collector thereof is coupled via lines 380 and 382 to the inductive components of switching function or relay S3. Line 382 further is coupled to +12 v regulated voltage supply and a diode, D13 is connected within line 384 extending across the inductive winding at 178 to accommodate for inductive surge. A load disconnected status is represented by light emitting diode (LED) 386 which is coupled within line 382 in conjunction with a current limiting resistor R32. The LED 386 is activated by drive supplied from an NPN transistor Q5, the collector of which is coupled to the cathode of LED 386 and the emitter of which is coupled to ground. The base of transistor Q5 is coupled through base resistor R33 to line 380 by line 382. Preferably, the inductive winding at 178 and the switch S3 are so configured that, with the loss of battery power, the switching function will normally assume a configuration wherein utility power is applied to the facility at hand. Where the switch operates in a "closed" manner applying inverter power as described at block 60 in conjunction with FIG. 2, inverter power is patched to the facility or home networks while the grid input from the utility is disconnected.

Figure 11:
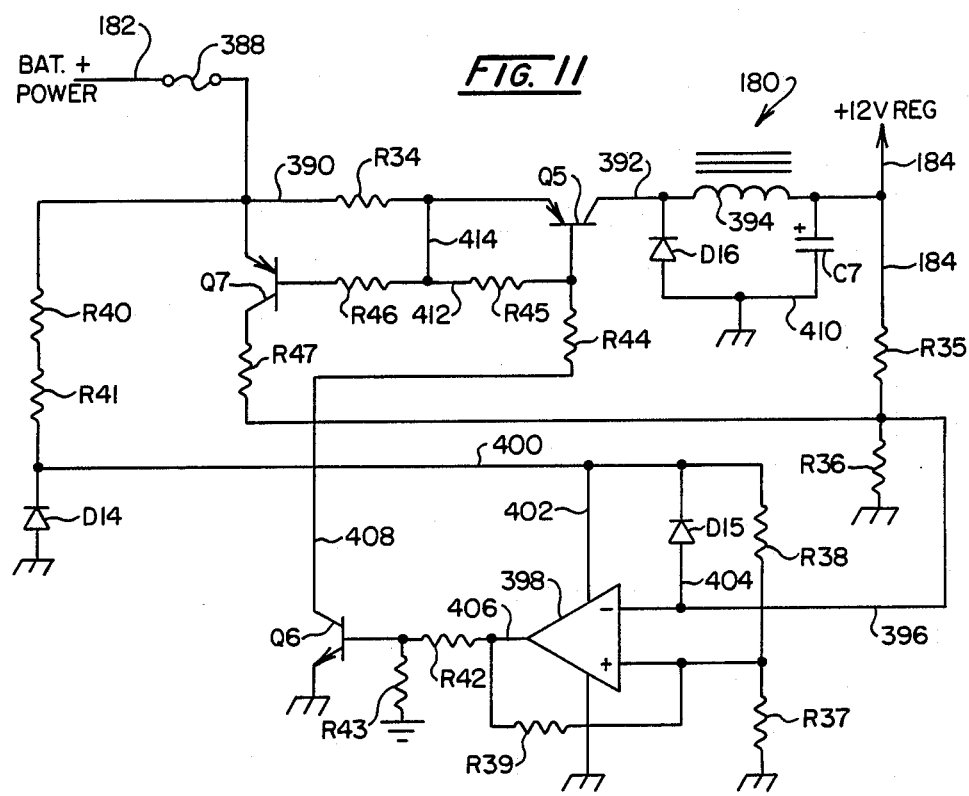
FIG. 11 is an electrical schematic diagram of a switching regulator employed with the apparatus of the invention.

Referring to FIG. 11, the voltage regulator function identified at box 180 in connection with FIG. 3 is portrayed in detail. Looking to the figure, it may be observed that power from the battery facility 28 is tapped as represented at line 182. Preferably, this current carrying line will be separated from that utilized to monitor battery voltage as described at 80 in FIG. 4. Battery power is directed through a fuse 388 to line 390 where it undergoes a switching form of regulation. In this regard, the current is directed through resistor R34 to the emitter of PNP transistor Q5 which selectively pulses or switches it for presentation at its collector output at line 392. Line 392 leads, in turn, to a torroidal inductor coil 394 for the purpose of filtering and a 12 volt regulated output is provided at line 184. This output is divided by a voltage divider network including resistors R35 and R36 and the thus-divided output is directed along line 396 to one input of a Schmitt trigger comprised of operational amplifier 398 operating in conjunction with resistors R37–R39. The amplifier 398 is powered via lines 400 and 402, the former extending to line 390 containing resistors R40, R41 and Zenner diode D14 which function to regulate the thus-available power. Diode D15 within line 404 functions to limit the input signal in further protection of the amplifier stage 398. The output of the Schmitt trigger 398 is directed along line 406 and through base resistor R42 to the base of NPN transistor Q6. A resistor R43 is coupled between the base of transistor Q6 and ground to enhance the turn-off characteristic of transistor Q6. The emitter of transistor Q6 is coupled to ground, while the collector thereof is connected by line 408 and base resistor R44 to the base of transistor Q5 to carry out the actuation or switching thereof. The filtering function including winding 394 also incorporates a capacitor C7 and fast recovery diode D16 coupled within line 410 between line 392 and ground. Diode D16 permits energy stored in the inductive winding 394 to drive the output during the interval when transistor Q5 is off. Resistor R45 within line 412 is coupled between line 408 and line 390 via line 414 and serves to enhance the turn-off characteristics of transistor Q5. Where excessive current may be encountered, PNP transistor Q7 is provided an operational arrangement wherein such current is reflected at resistor R34 to cause transistor Q7 to turn on for regulation through resistor R34 and the remainder of the circuitry. Resistor R46 limits the base current to transistor Q7. Any such excess current directed through resistor R47 functions to turn off the Schmitt trigger including stage 398 rapidly.

Figure 12:
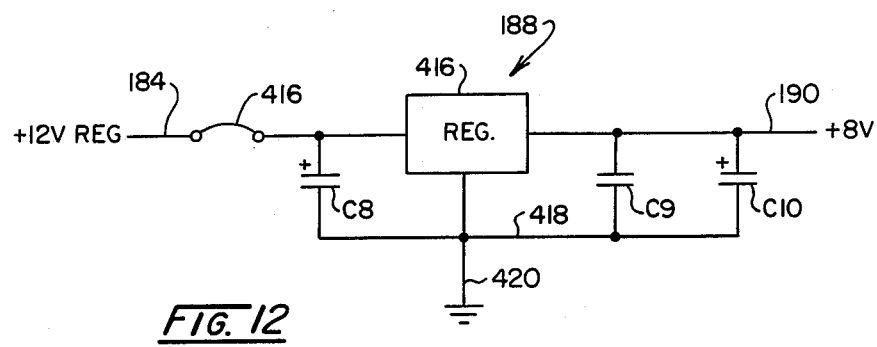
FIG. 12 is an electrical schematic diagram of a secondary regulating function of the apparatus of the invention.

Referring to FIG. 12, the secondary regulation described in conjunction with block 188 in FIG. 3 is portrayed in enhanced detail. The regulated 12 volt output of switching regulator 180 is directed, as represented at line 184, through a jumper 416 to an 8 volt regulator represented at block 416. Regulator 416 may be of a conventional variety, for example a type 7808 and, provides an 8 volt regulated supply output at line 190. Capacitors C8–C10 are coupled between input line 416, output line 190, and ground via lines 418 and 420 and, thus, across the regulator to improve the quality of its output at line 190. The 8 volt regulated supply output at line 190 is distributed for use in the logic components described herein in conjunction with FIGS. 4–10 between input line 416, output line 190 and ground via lines 418 and 420. Separate ground return paths are used for voltage sensing and relay power circuits.

Since certain changes may be made in the above apparatus without departing from the scope of the invention herein involved, it is intended that all matter contained in the above description or shown in the accompanying drawings shall be interpreted as illustrative and not in a limiting sense.

We claim:
1. Interface apparatus for selectively applying power generated by an energy source to a storage battery exhibiting variable battery voltage values including values representing fully charged and predetermined chargeable conditions, said source having given currents and levels of voltage, said apparatus comprising:
   charge switch means actuable between open and closed conditions for electrically coupling said storage battery and said source;
   first monitoring means for monitoring said source for the presence of said current and having enable and disable conditions in the respective presence and absence thereof;
   second monitoring means for monitoring said source for the presence of said source voltage and said storage battery for said voltage values and having an enable signal when said source voltage level is at least equal with a monitored said battery voltage value;
   third monitoring means for monitoring said storage battery and having a charge start output when said battery voltage value represents said predetermined chargeable condition; and
   control means responsive to said second monitoring means enable signal and to said third monitoring means charge start output to transition from a non-charge condition to a charge condition for actuating said charge switch means to said closed condition for a predetermined sampling interval of time, responsive to said first monitoring means enable condition in the presence of said second monitoring means enable signal and further in the presence of said third monitoring means charge start output to maintain said charge condition said control means being responsive at the termination of said sampling interval in the absence of said first monitoring means enable condition to actuate said charge switch means from said closed condition to said open condition.

2. The interface apparatus of claim 1 in which said predetermined sampling interval is selected as about one minute.

3. The interface apparatus of claim 1 in which said first monitoring means comprises a current sensing shunt network including a resistor coupled with the output of said source and deriving a voltage signal in the presence of a predetermined level of current at said output representing said enable condition; and
   said control means includes delay network means for deriving said predetermined sampling interval.

4. The interface apparatus of claim 3 in which said delay network means includes:
   clock means responsive to said enable condition for deriving a clock input signal; and
   counter means having an output deriving said enable condition and responsive to said clock input signal for deriving said disable condition at said output following a said predermined interval of time from the commencement of said clock input, and reset means responsive to said voltage signal to effect overriding derivation of said enable condition and responsive to said second monitoring means enable signal and said third monitoring means charge start input to derive said enable condition.

5. The interface apparatus of claim 1 including:
   fourth monitoring means for monitoring said storage battery and having a charge stop output when said battery voltage value represents said fully charged condition; and wherein said control means is responsive to said charge stop output to transition to said non-charge condition for actuating said charge switch means to said open condition.

6. The interface apparatus of claim 5 including:

divert switch means actuable from an open to a closed condition for electrically coupling said energy source with a secondary load; and said control means is responsive to said second monitoring means enable signal and said fourth monitoring means charge stop output to actuate said divert switch means to said closed condition.

7. The interface apparatus of claim 1 including:

divert switch means actuable from an open to a closed condition for electrically coupling said energy source with a secondary load; and said control means is responsive to said second monitoring means enable condition in the presence of said non-charge condition to actuate said divert switch means to said closed condition for effecting said coupling of said energy source and said secondary load.

8. The interface apparatus of claim 1 including:

power-up reset circuit means responsive to the application of activating power to said control means for deriving a charge stop signal for a predetermined interval of time; and said control means is responsive to said charge stop signal to provide said non-charge condition to effect said charge switch means open condition.

9. The interface apparatus of claim 1 including:

fourth monitoring means for monitoring said storage battery voltage and having a charge stop output when said battery voltage value represents said fully charged condition;

divert switch means actuable from an open to a closed condition for electrically coupling said energy source with a second load; and said control means is responsive to said charge stop output to transition to said non-charge condition for actuating said charge switch means to said open condition and responsive to said second monitoring means enable condition in the presence of said non-charge condition to actuate said divert switch means to said closed condition.

10. The interface apparatus of claim 9 in which said predetermined sampling interval is selected as about one minute.

11. In an electrical power distribution system for a facility having an a.c. powered input, an alternate d.c. power source having given intermittently available levels of voltage and current, battery storage means exhibiting variable battery voltage values including values representing fully charged and predetermined chargeable conditions, an inverter for providing an alternate a.c. power input, and a distribution switch arrangement actuable to alternatively connect and disconnect select said a.c. power inputs with a primary load, an improved interface apparatus comprising:

charge switch means actuable between open and closed conditions for electrically coupling said battery storage means and said d.c. source;

battery voltage sensing means for monitoring said battery storage means battery voltage value and having a sensed battery voltage level output;

voltage monitoring means for monitoring said d.c. source for the presence of a said voltage level and said sensed battery voltage level output when said charge switch means is in said open condition and having an enable signal when said d.c. source voltage level is at least equal with a said sensed battery voltage level output;

first charge monitoring means for monitoring said battery storage means and having a charge start output when said sensed battery voltage level output represents said predetermined chargeable condition;

control means responsive to the occurrence of said voltage monitoring means enable signal with said first charge monitoring means charge start output for transitioning in the presence of an enable condition from a non-charge to a charge condition to effect actuation of said charge switch means to said closed condition and responsive to a disable condition for transitioning from said charge to said non-charge condition to effect actuation of said charge switch means to said open condition;

current detector means responsive to the generation of said current by said d.c. source when said charge switch means is in said closed condition and having a current detect signal in the presence thereof; and delay means responsive to said control means charge condition to provide an output representing said enable condition for a predetermined sample interval and providing an output representing said disable condition at the termination of said interval and responsive in the presence of said current detect signal to prevent derivation of said disable condition.

12. The interface apparatus of claim 11 in which said delay means is responsive to said control means charge condition to derive a second sampling delay in response to said disable condition to effect a delay in generating said enable condition selected for effecting monitoring performance by said voltage monitoring means.

13. The interface apparatus of claim 11 including second charge monitoring means for monitoring said sensed battery voltage level output and having a said disable condition when said sensed battery voltage level output represents a fully charged condition.

14. The interface apparatus of claim 13 including:

divert switch means actuable to a closed condition for electrically coupling said alternate source with a secondary load; and said control means is responsive to said voltage monitoring means enable signal and said second charge monitoring means disable condition to actuate divert switch means to said closed condition.

15. The interface apparatus of claim 13 including:

divert switch means actuable to a closed condition for electrically coupling said alternate source with a secondary load; and said control means is responsive to said voltage monitoring means enable signal occurring with said non-charge condition to actuate said divert switch means to said closed condition.

16. The interface apparatus of claim 11 including:

third charge monitoring means for monitoring said sensed battery voltage level output and having a connect signal when said battery voltage value equals or exceeds a predetermined connect value;

fourth charge monitoring means for monitoring said sensed battery battery voltage level output and having a disconnect signal when said battery voltage value equals or is below a predetermined value; and said control means is responsive to said connect signal to actuate said distribution switch arrangement to connect said alternate a.c. input with said primary load and, simultaneously, disconnect said a.c. power input therefrom and is responsive to said disconnect signal to actuate said distribution switch arrangement to connect said a.c. power input with said primary load and, simultaneously, disconnect said alternate a.c. input therefrom.

17. The interface apparatus of claim 16 in which said control means includes delay network means for selectively delaying the said monitoring of said sensed battery voltage level output by said third and fourth charge monitoring means.

18. The interface apparatus of claim 11 including:
switching voltage regulator means coupled with said battery storage means for deriving a first regulated output for effecting the actuation of said distribution switch arrangement and said charge switch means; and logic component voltage regulator means responsive to said first regulated output for providing a second regulated output for energizing said current detector means, said voltage monitoring means, said first charge monitoring means, and said control means.

19. Apparatus for charging a storage battery exhibiting battery voltage values representing fully charged and predetermined chargeable conditions from an energy source having given current and levels of voltage, comprising:

charge switch means actuable between open and closed conditions for electrically coupling said battery and said source;

voltage monitoring means for monitoring said source for the presence of a said voltage level and said battery voltage when said charge switch means is in said open condition and having an enable signal when said source voltage level is at least equal with a said battery voltage value;

first charge monitoring means for monitoring said battery and having a charge start output when said battery voltage value represents said predetermined chargeable condition;

control means responsive to the occurrence of said voltage monitoring means enable signal with said first charge monitoring means charge start output for transitioning from a non-charge to a charge condition to effect actuation of said charge switch means to said closed condition and responsive to a disable condition for transitioning from said charge to said non-charge condition to effect actuation of said charge swtich means to said open condition;

current detector means responsive to the generation of said current by said source when said charge switch means is in said closed condition and having a current detect signal in the presence thereof; and delay means responsive to said control means charge condition for a predetermined sample interval and deriving said disable condition at the termination of said interval and responsive in the presence of said current detect signal to prevent derivation of said disable condition.

20. The interface apparatus of claim 19 including second charge monitoring means for monitoring said storage battery voltage values and having a said disable condition when said battery voltage value represents a fully charged condition.

21. Apparatus for selectively applying power from an energy source to a rechargeable storage battery having an electrolyte and exhibiting variable voltage values including values representing a fully charged condition wherein the gassing potential said electrolyte is approached and a predetermined chargeable condition corresponding with a rest voltage level;

charge switch means actuable between open and closed conditions for electrically coupling said storage battery and said source;

battery voltage sensing means for monitoring said storage battery voltage values and having a sensed battery voltage level output;

charge start monitoring means including first reference voltage network means for providing a first reference voltage, and first comparator means responsive to said first reference voltage and to said sensed battery voltage level output for deriving a charge start signal at an output when said sensed battery voltage level output is equal with said first reference voltage;

charge stop monitoring means including second reference voltage network means for providing a second reference voltage of predetermined value greater than said first reference voltage, and second comparator means responsive to said second reference voltage and to said sensed battery voltage level output for deriving a charge stop signal at an output when said sensed battery voltage level output is equal wih said second reference voltage, so as to derive a pulsed charging of said battery; and control means responsive to said charge start signal for actuating said charge switch means into said closed condition and responsive to said charge stop signal for causing said charge switch means to derive said open condition, said control means including regulated power supply circuit means including regulating switch means connectable with said storage battery and actuable to provide a pulsed current output, filter means for filtering said pulsed current output to provide a regulated voltage output comparator means having a first input responsive to said regulated voltage output and a second input responsive to said storage battery voltage value for actuating said regulating switch means.

22. The apparatus of claim 21 in which:
said charge switch means comprises a relay having an inductive winding energizable for effecting a said actuation into said closed condition;
said control means comprises:
driver circuit means having an output coupled with said relay inductive winding and said regulated voltage output and an input and responsive to an actuating signal at said input for effecting said energization of said winding, and
flip-flop means having a first input terminal coupled with said first comparator means output, a second input terminal coupled with said second comparator means output, and an output terminal coupled to said driver circuit means input for asserting said actuating signal in response to said charge start signal.

23. The apparatus of claim 21 in which said regulated power supply circuit means includes current detecting transistor means responsive to current from said storage battery and coupled with said regulated voltage output when said current exceeds a predetermined level.

24. The apparatus of claim 21 in which said charge switch means comprises a relay having an inductive winding energizable from a regulated voltage output for effecting a said actuation into said closed position.

* * * * *